United States Patent [19]

Triponez

[11] Patent Number: 4,969,133

[45] Date of Patent: Nov. 6, 1990

[54] TIMEPIECE INCLUDING AT LEAST TWO MOTORS

[75] Inventor: André Triponez, Lamboing, Switzerland

[73] Assignee: Eta S.A. Fabriques d'Ebauches, Granges, Switzerland

[21] Appl. No.: 511,724

[22] Filed: Apr. 20, 1990

[30] Foreign Application Priority Data

Apr. 21, 1989 [CH] Switzerland ............... 01535/89
Nov. 17, 1989 [CH] Switzerland ............... 04147/89

[51] Int. Cl.⁵ ..................... G04B 19/00; G04F 5/00
[52] U.S. Cl. ........................... 368/80; 368/110; 368/160
[58] Field of Search .............. 368/76, 80, 88, 157, 368/160, 107, 113

[56] References Cited

U.S. PATENT DOCUMENTS

| | | | |
|---|---|---|---|
| 4,477,759 | 10/1984 | Guerin et al. | 368/157 |
| 4,623,361 | 11/1986 | Muto | 368/80 |
| 4,681,464 | 7/1987 | Ray | 368/157 |
| 4,748,603 | 5/1988 | Ray et al. | 368/80 |
| 4,788,669 | 11/1988 | Kamiyama | 368/80 |

*Primary Examiner*—Vit W. Miska
*Attorney, Agent, or Firm*—Griffin Branigan & Butler

[57] ABSTRACT

A timepiece includes at least two motors (1, 2), in which the shafts (4, 16) of the rotors (3, 15) are arranged head-to-foot in a manner such that the free end of the pinion (27) fixed to the shaft of one rotor extends in the direction opposite to that in which extends the free end of the pinion (30) fixed to the shaft of the other rotor. Each of the pinions (27, 30) is in mesh with a toothed wheel (26, 29), such wheels being mounted coaxially with one another on either side of a base plate (40). Each of the wheels directly controls a hand (25, 28) indicating a unit of time.

10 Claims, 5 Drawing Sheets

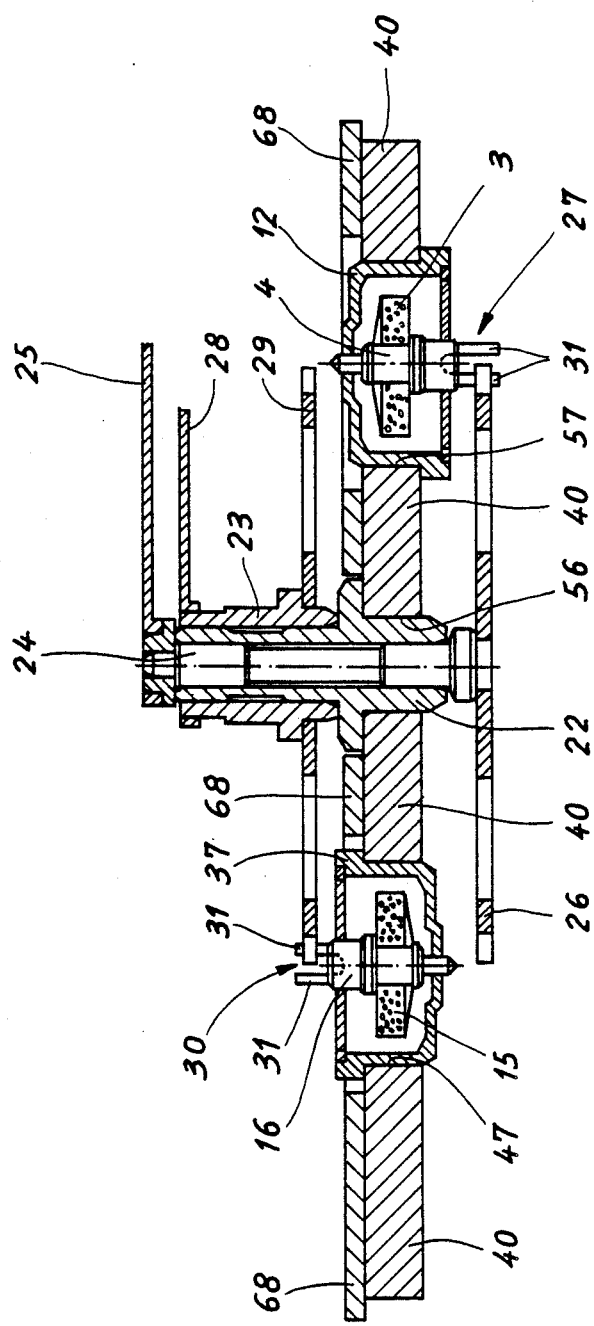

TIMEPIECE INCLUDING AT LEAST TWO MOTORS

This invention concerns a timepiece with an analog display including at least two electromagnetic motors, said motors each including a magnetized rotor mounted to rotate about a shaft and a stator formed from a plate including at least two polar expansions surrounding the rotor, said plate being magnetically coupled to at least one core on which is wound an excitation coil.

BACKGROUND OF THE INVENTION

Timepieces including more than one motor have been proposed on many occasions. A design of this type is shown for instance in the patent document GB-A-2 005 875 which describes a chronograph provided with a quartz oscillator including two individual driving arrangements for the hands, each comprising a stepping motor and a wheel train interposed between the motor pinion and the toothed wheel secured to the axis bearing the hand. There is thus no direct connection between the pinion and the toothed wheel as will appear in the present invention.

To avoid all wheel trains between the driving rotor and the indicating hand, the patent document EP-A-0 312 946 proposes a timepiece including two multipolar motors, the rotors of which are coaxial, each rotor driving an indicating hand. The rotor of one of the motors is mounted on a shaft which bears a seconds hand and the rotor of the other motor is mounted on the pipe of a cannon pinion traversed by said shaft, such pipe bearing a minutes hand. If this design exhibits the advantage of direct drive in the sense that the hands are fixed to the rotors which drive them, it must be noted that said construction requires very special motors, the rotors of which advance by making a very large number of steps for each revolution, in particular 60 steps. Such motors are not easy to obtain and the appearance of simplicity from the elimination of the wheel trains is compensated by the complexity of the motor production and the motor control.

SUMMARY OF THE INVENTION

To overcome the cited difficulties, the timepiece in accordance with the invention at the same time as it proposes a construction enabling saving space in height, diminishing the number of moving mechanical components and simplifying the construction and the assembly is characterized by the fact that it further includes a guide tube arranged to receive, on the interior thereof, a shaft on the first end of which is fixed a hand suitable for indicating a first time unit and on the second end of which is secured a first toothed wheel in mesh with a first pinion placed at the end of the shaft of one of the rotors, and, on the exterior, a pipe on the first end of which is fixed a hand suitable for indicating a second time unit and on the second end of which is secured a second toothed wheel in mesh with a second pinion placed at the end of the shaft of the other rotor, the shafts of said rotors being arranged head-to-foot in a manner such that the free end of said first pinion extends in a direction opposite to that in which extends the free end of said second pinion.

Characteristics specific to this invention are now about to be explained in the description to follow, which description is illustrated by way of example by means of the annexed drawings.

BRIEF DESCRIPTION OF THE DRAWINGS

FIG. 5 is a cross-section along the broken line V—V of FIG. 3.

DESCRIPTION OF THE PREFERRED EMBODIMENT

Figure 1:
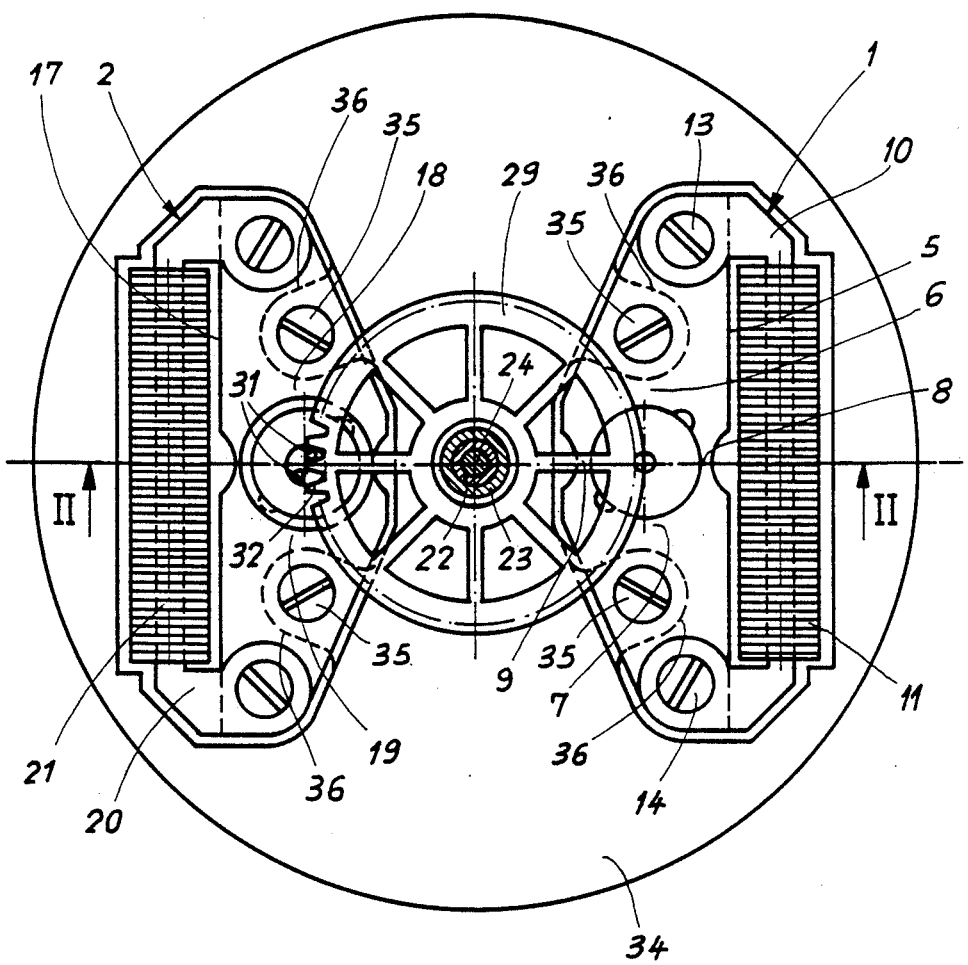
FIG. 1 is a plan view of the timepiece according to a first embodiment of the invention, and this view retains only those parts essential for understanding the invention; the mechanism lacks the case in which it is mounted as well as the time indicating hands and dial.
Figure 2:
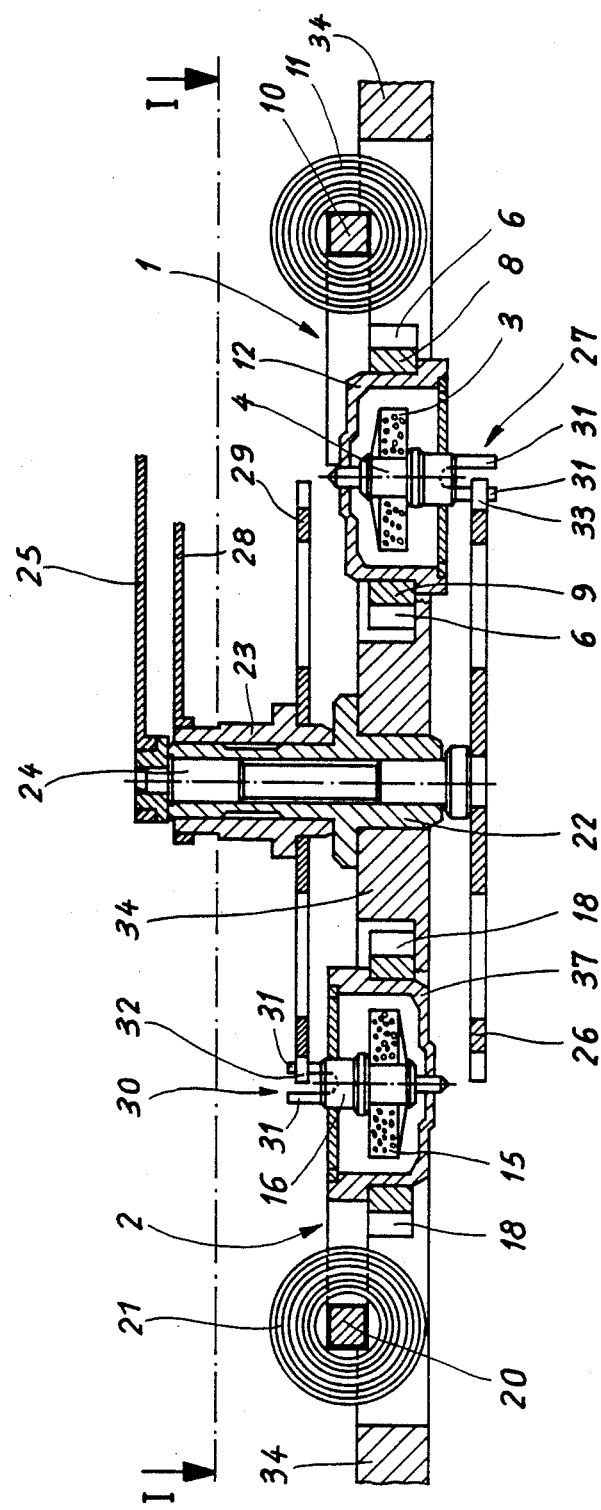
FIG. 2 is a cross-section at an enlarged scale along line II—II of FIG. 1 in which figure the hands have been shown, line I—I simulating a plan of the cross-section below which the plan view of FIG. 1 is taken.

FIGS. 1 and 2 show respectively a plan view and a cross-section of a timepiece in accordance with the invention and a first embodiment thereof. In a completely general manner, this timepiece with an analog display includes two electromagnetic motors 1 and 2 preferably of the stepping type. Motor 1 comprises a magnetized rotor 3 mounted to rotate about a shaft 4 and a stator formed from a plate 5 including two polar expansions 6 and 7 surrounding the rotor. In a known manner, the expansions are formed thanks to two constrictions or necks 8 and 9. Plate 5 is magnetically coupled to a core 10 on which is wound an excitation coil 11. This coupling is obtained by means of two screws 13 and 14 which secure core 10 onto plate 5. In the embodiment shown on FIGS. 1 and 2, rotor 3 is mounted in a cage 12 forced into the stator. Such an embodiment has already been described in patent document CH-A-639 525 corresponding to U.S. Pat. No. 4,483,627. By analogy motor 2 comprises a magnetized rotor 15 mounted for rotation about a shaft 16 and a stator formed in a plate 17 including two polar expansions 18 and 19 surrounding the rotor. Plate 17 is magnetically coupled to a core on which is wound an excitation coil 21.

As shown on FIGS. 1 and 2, the timepiece further includes a guide tube 22. This tube receives in its interior a shaft 24 at the first end of which is fixed a hand 25 suitable for indicating a first unit of time (for instance minutes) and at the second end of which is secured a first toothed wheel 26 in mesh with a first pinion 27 placed at the end of the shaft 4 of rotor 3. Guide tube 22 likewise receives on its exterior a pipe 23 on the first end of which is fixed a hand 28 suitable for indicating a second unit of time (for instance hours) and at the second end of which is secured a second toothed wheel 29 in mesh with a second pinion 30 placed on the end of shaft 16 of rotor 15. In the embodiment shown by way of example pinions 27 and 30 are each formed of two spurs 31. The figures show that the spurs 31 of pinion 30 mesh with teeth 32 of wheel 29 in the same manner as the spurs 31 of pinion 27 mesh with the teeth 33 of wheel 26.

Thus as is shown particularly well on FIG. 2, shafts 4 and 16 of rotors 3 and 15 are arranged head-to-foot in a manner such that the free end of the first pinion 27 extends in a direction opposite to that in which extends the free end of the second pinion 30.

The explanations which have just been given hereinabove have described the essentials of the invention in referring to the first embodiment shown on FIGS. 1 and 2. One could have made reference to FIGS. 3, 4 and 5 showing a second embodiment of the invention in order to give the same explanations of the principle, these latter figures clearly showing as will be seen from the description to follow a constructional concept identical to that of FIGS. 1 and 2.

The first embodiment of the invention relative to FIGS. 1 and 2 is mainly characterized by the fact that motors 1 and 2 are independent units each comprising a stator and a rotor. Each motor is separately assembled as a unit by itself, then is fastened onto a baseplate 34 supporting all the mechanism of the timepiece as well as the energy source and the electrical circuits, these latter not being shown on the drawing. Motors 1 and 2 are next secured onto baseplate 34 by means of screws 35 traversing the stator plates 5 and 17 and screwed into the lugs 36 forming part of the baseplate. In this first embodiment it may be seen (FIG. 2) that it suffices to assemble cage 12 of rotor 3 in a manner inverted to the assembly of cage 37 of rotor 15. It will be likewise observed that in this embodiment guide tube 22 is directly mounted on the baseplate and that from this fact wheels 26 and 29 are situated coaxially on either side of baseplate 34.

FIG. 1 shows two diametrally opposed motors. One could have them approach one another in order to provide more place for other elements making up the timepiece. In the same manner, each of the motors includes only one coil. One could have a motor with two coils as has been described for instance in U.S. Pat. No. 4,371,821.

Figure 3:
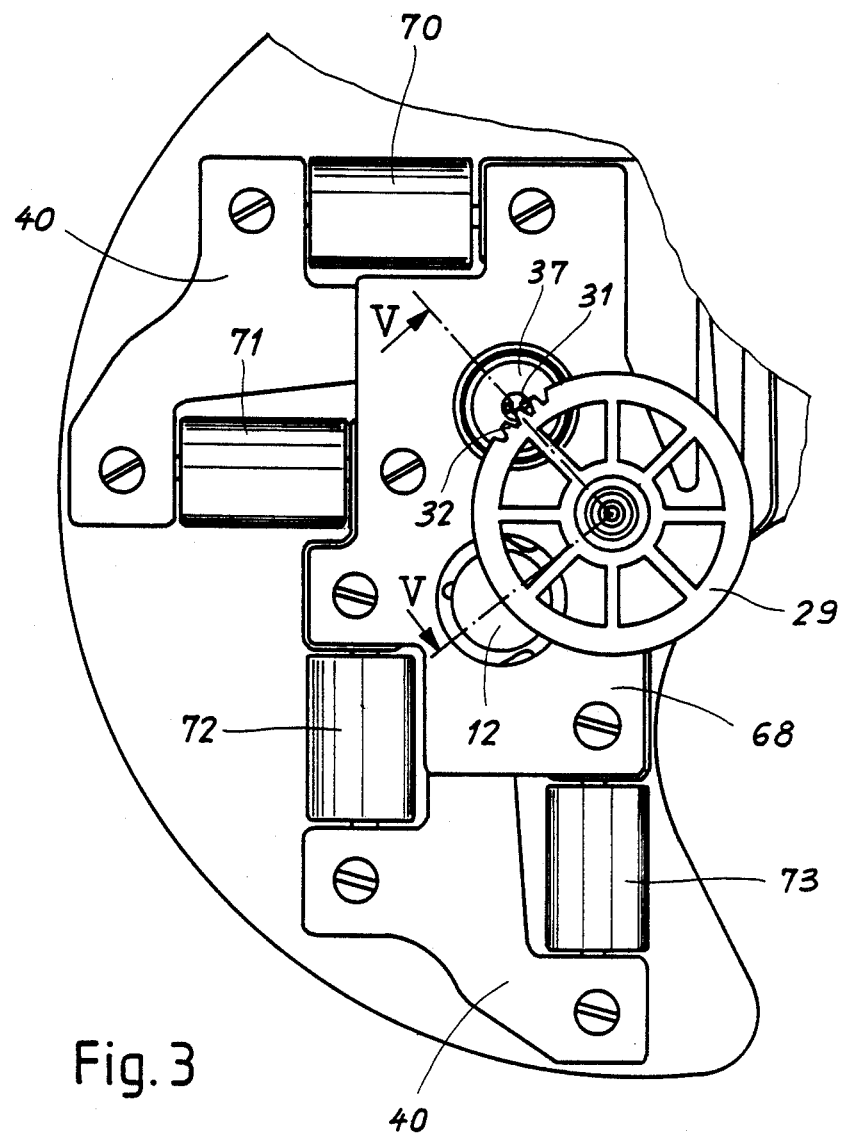
FIG. 3 is a partial plan view of the timepiece according to a second embodiment of the invention.
Figure 4:
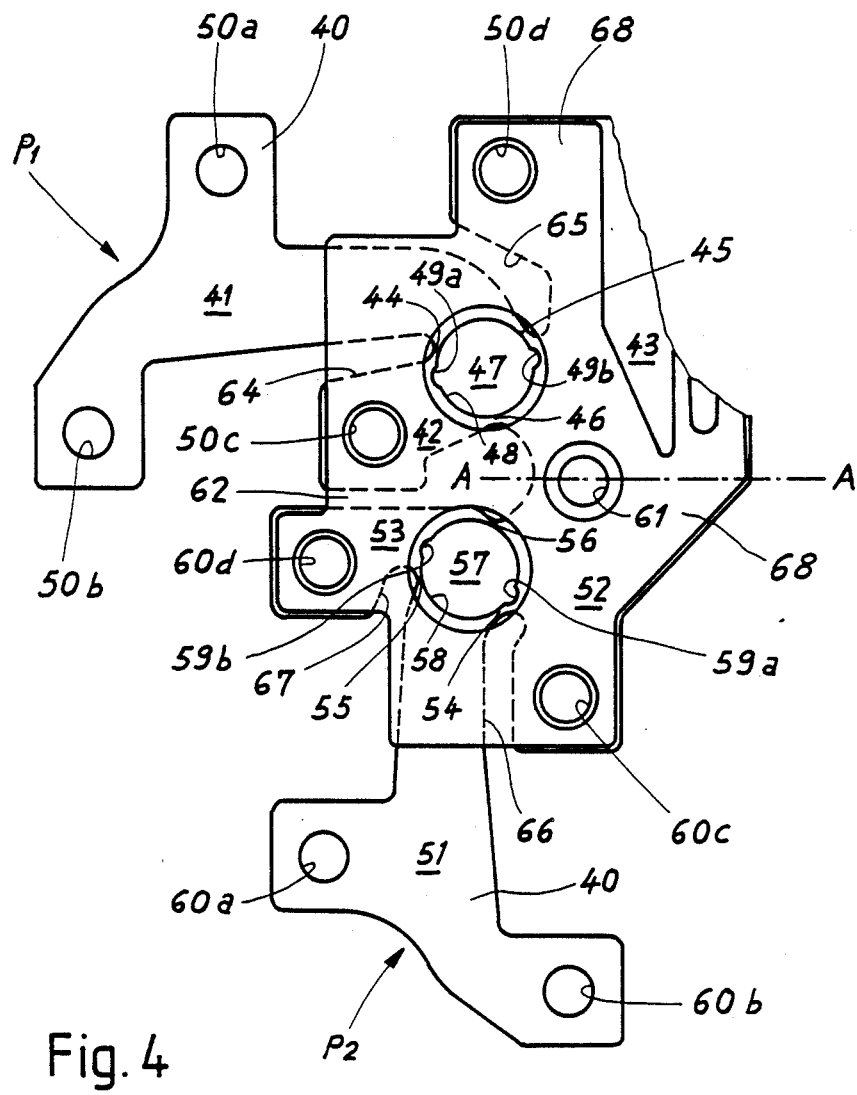
FIG. 4 is a detailed drawing at an enlarged scale of the stator of the motors shown on FIG. 3.

The second embodiment of the invention is shown on FIGS. 3, 4 and 5. One may find in this second embodiment elements which are similar to those already described with reference to the first embodiment. For the elements common to both designs the same reference numbers will accordingly be employed. This second embodiment is distinguished from the first by the fact that the stators of the motors are blanked in a single plate 40 cut out in a manner such that it exhibits the necessary polar expansions for the independent functioning of each motor. This plate 40 obtained from a magnetic material clearly appears on FIG. 4.

Plate 40 may be considered as being formed from two parts P1 and P2, separated by the line A—A and arranged perpendicularly relative to one another, each of which corresponds to the stator of a bidirectional motor such as has formed the object of U.S. Pat. No. 4,371,821 previously cited.

Part P1 effectively shows three pole parts 41, 42 and 43 which are connected among themselves by necks 44, 45 and 46, a cavity 47 which is surrounded by a substantially cylindrical internal wall 48 formed by these pole parts and these necks and which is intended to accommodate a rotor having a permanent bipolar magnet and two diametrally opposed notches 49a and 49b provided in the internal wall 48 in order to create two rest positions angularly separated by 180° for such rotor.

In addition, part P1 is shaped and pierced with four holes 50a, 50b, 50c, 50d in order to enable securing thereto, for instance by screws, of two cores each surrounded by a coil which will couple pole part 41 respectively to pole parts 42 and 43 being situated on either side of the former and substantially parallel to line A—A.

In the same manner, part P2 of plate 40 comprises three pole parts 51, 52 and 53 which correspond respectively to those 41, 42 and 43 of part P1 but which do not have at all the same form or the same dimensions except insofar as concerns part 51 which scarcely differs from part 41.

There will likewise be found in part P2 three necks 54, 55 and 56 which couple two-by-two pole parts 51, 52 and 53, a cavity 57 bounded by a basically cylindrical internal wall 58 and having the same diameter as wall 48 of part P1, for the housing of another rotor having a bipolar magnet, two notches 59a and 59b which are diametrically opposed in wall 58 and holes 60a, 60b, 60c and 60d for securing two other cores surrounded by two other coils which will couple pole part 51 to pole parts 52 and 53 in being placed on each side of part 51, but which will be in this case, substantially perpendicular to line A—A. In addition, plate 40 includes a further cylindrical hole 61 placed in a manner such that its axis is equidistant from those of cavities 47 and 57.

In considering FIG. 4, it is easy to see that because of cavities 47 and 57, slot 62, cavity 63 and the four more or less deep notches 64, 65, 66 and 67, this stator normally presents an entire zone which is particularly fragile including as it does all these empty spaces in which it may easily be bent or twisted, principally around the necks where it may even be broken when it is manipulated along with others without taking due care. This requires the presence of a non-magnetic reinforcement plate 68.

One assembles onto reinforced plate 40 the four windings 70, 71, 72 and 73 and cages 12 and 37 respectively equipped with their rotors 3 and 15 as is shown on FIGS. 3 and 5, the cages being assembled inverted to one another as is the case in the first embodiment.

As may readily be seen on FIG. 5, guide tube 22 is no longer secured to the base plate as was the case in the first embodiment but is forced into hole 56 of plate 40. In the interior and on the exterior of this tube are respectively arranged shaft 24 and pipe 23 which receive on one side hands 25 and 28 and on the other side toothed wheels 26 and 29. In this embodiment one may see that wheels 26 and 29 are coaxially situated on either side of plate 40 which is the sole stator for the two motors.

This description may be completed by several remarks which apply to both embodiments as envisaged hereinabove.

One may determine initially that if guide tube 22 is equidistant from shafts 4 and 16 of rotors 3 and 15, toothed wheels 26 and 29 exhibit the same diameter and the same toothing. This represents an advantage since these wheels may then be formed by the same tool.

It has already been mentioned that hand 25 indicates minutes and hand 28 hours. In this case one will arrange to provide rotor 3 with one pulse per minute and rotor 15 one pulse every six minutes. This mode of operation is suitable for a timekeeper displaying hours and minutes. One could however apply to rotor 3 one pulse per second and hand 25 would become a seconds hand; in the same manner, one could apply to rotor 15 one pulse per minute in a manner such that hand 28 would become a minutes hand, thus transforming the timekeeper into a chronograph.

In a completely general manner, the head-to-foot assembly of the shafts of the rotors enables effecting, as may be seen on the cross-sectional drawings of FIGS. 2 and 5, a maximum reduction of the number of moving mechanical pieces as well as the space taken up in height within the timepiece. One thus obtains economies by reducing the number of parts while simplifying the construction and the assembly of this timepiece.

What I claim is:

1. A timepiece having an analog display including at least two electromagnetic motors, each of said motors including a magnetized rotor mounted for rotation about a shaft and a stator formed by a plate including at least two polar expansions surrounding the rotor, said plate being magnetically coupled to at least one core on which is wound an excitation coil and further including a guide tube arranged to receive, in its interior, a shaft on the first end of which is fixed a hand suited to indicate a first unit of time and on the second end of which is secured a first toothed wheel in mesh with a first pinion placed at the end of the shaft of one of the rotors, and, on its exterior, a pipe on the first end of which is fixed a hand suited to indicate a second unit of time and on the second end of which is secured a second toothed wheel in mesh with a second pinion placed at the end of the shaft of the other rotor, the shafts of said rotors being arranged head-to-foot in a manner such that the free end of said first pinion extends in the direction opposite to that in which extends the free end of said second pinion.

2. A timepiece as set forth in claim 1 wherein the guide tube is arranged equidistant from the shafts of the rotors and wherein the first and second toothed wheels each have the same diameter and the same toothing.

3. A timepiece as set forth in claim 1 wherein the motors are independent units each including a stator and a rotor, each unit being secured on a base plate on which is secured the guide tube.

4. A timepiece as set forth in claim 1 wherein the stators of the motors are blanked in a single plate, the cutting being arranged so as to exhibit the polar expansions required for independent functioning of each motor and wherein the guide tube is secured on said single plate.

5. A timepiece as set forth in claim 3 wherein each stator includes a single core around which a coil is wound.

6. A timepiece as set forth in claim 3 wherein each stator includes two cores around each of which a coil is wound.

7. A timepiece as set forth in claim 1 wherein the hand fixed to the shaft passing through the interior of the guide tube is a minutes hand, the hand fixed to the pipe arranged on the exterior of the guide tube is an hours hand and said timepiece functions as a time keeper.

8. A timepiece as set forth in claim 1 wherein the hand fixed to the shaft passing through the interior of the guide tube is a seconds hand, the hand fixed to the pipe arranged on the exterior of the guide tube is a minutes hand and said timepiece functions as a chronograph.

9. A timepiece as set forth in claim 4 wherein each stator includes a single core around which a coil is wound.

10. A timepiece as set forth in claim 4 wherein each stator includes two cores around each of which a coil is wound.

* * * * *